(12) United States Patent
Kim et al.

(10) Patent No.: US 10,990,172 B2
(45) Date of Patent: Apr. 27, 2021

(54) PUPIL TRACKING DEVICE AND PUPIL TRACKING METHOD FOR MEASURING PUPIL CENTER POSITION AND PROXIMITY DEPTH BETWEEN OBJECT AND PUPIL MOVING BY OPTOKINETIC REFLEX

(71) Applicant: Electronics and Telecommunications Research Institute, Daejeon (KR)

(72) Inventors: Kwang-Yong Kim, Sejong-si (KR); Kibong Song, Daejeon (KR); JungWoo Park, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/555,786

(22) Filed: Aug. 29, 2019

(65) Prior Publication Data

US 2020/0159317 A1    May 21, 2020

(30) Foreign Application Priority Data

Nov. 16, 2018  (KR) .......................... 10-2018-0141303

(51) Int. Cl.
    *G06F 3/01*    (2006.01)
    *F21V 8/00*    (2006.01)

(52) U.S. Cl.
    CPC ............. *G06F 3/013* (2013.01); *G02B 6/005* (2013.01)

(58) Field of Classification Search
    CPC ....... G06F 3/013; A61B 3/0025; A61B 3/113; G02B 6/005; G02B 5/32; G02B 27/48; G02B 27/0018; G02B 26/0841; G02B 2027/012; G02B 2027/0178; G02B 2027/0174; G09G 3/346; G03H 2222/18; G03H 2001/0439
    See application file for complete search history.

(56) References Cited

U.S. PATENT DOCUMENTS

| | | | |
|---|---|---|---|
| 2005/0137586 A1 | 6/2005 | Gray et al. | |
| 2011/0310238 A1 | 12/2011 | Koh et al. | |
| 2014/0098198 A1 | 4/2014 | Lee et al. | |
| 2017/0082858 A1* | 3/2017 | Klug | A61B 5/1122 |
| 2018/0172981 A1 | 6/2018 | Ishii | |
| 2018/0249906 A1* | 9/2018 | Gramatikov | A61B 3/0025 |
| 2018/0284886 A1* | 10/2018 | Mardanbegi | G06F 3/0487 |

FOREIGN PATENT DOCUMENTS

| | | |
|---|---|---|
| KR | 10-2007-0026376 A | 3/2007 |
| KR | 10-2011-0038568 A | 4/2011 |
| KR | 10-2015-0098500 A | 8/2015 |

* cited by examiner

*Primary Examiner* — Christopher E Leiby
(74) *Attorney, Agent, or Firm* — Rabin & Berdo, P.C.

(57) ABSTRACT

Provided is a pupil tracking device, which measures a pupil center position of an eye moving according to an optokinetic reflex, and a proximity depth between a pupil and an object, the pupil tracking device including a light source configured to output infrared light, a display configured to output object light, a waveguide configured to guide the infrared light and the object light towards a direction to the pupil, a film configured to separate the infrared reflected by a cornea of the eye into a plurality of light beams, and an optical pickup configured to detect the plurality of light beams and measure the pupil center position and the proximity depth.

20 Claims, 11 Drawing Sheets

FIG. 8

| Pupil Movement Direction / Output Voltage | Right | Left | Up | Down | Converge (Move close to) |
|---|---|---|---|---|---|
| First Optical Detector | (+) | (−) | 0 | 0 | (−) |
| Second Optical Detector | (+) | (−) | 0 | 0 | (−) |
| Third Optical Detector | 0 | 0 | (+) | (−) | 0 |
| Fourth Optical Detector | 0 | 0 | (+) | (−) | 0 |

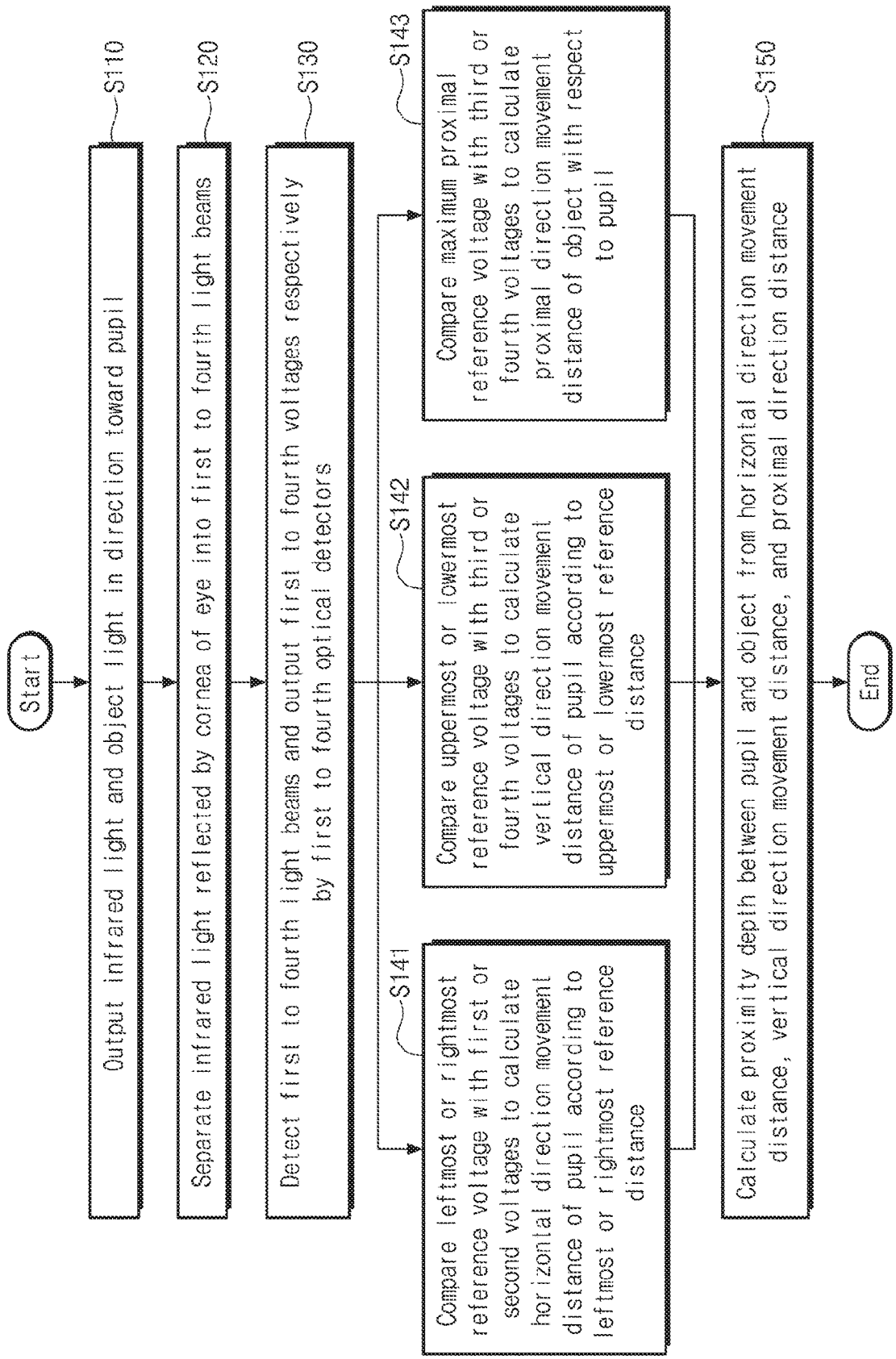

PUPIL TRACKING DEVICE AND PUPIL TRACKING METHOD FOR MEASURING PUPIL CENTER POSITION AND PROXIMITY DEPTH BETWEEN OBJECT AND PUPIL MOVING BY OPTOKINETIC REFLEX

CROSS-REFERENCE TO RELATED APPLICATIONS

This U.S. non-provisional patent application claims priority under 35 U.S.C. § 119 of Korean Patent Application No. 10-2018-0141303, filed on Nov. 16, 2018, the entire contents of which are hereby incorporated by reference.

BACKGROUND

The present disclosure herein relates to a pupil tracking device and a pupil tracking method, and more particularly, to a pupil tracking device and a pupil tracking method for measuring a pupil center position and a proximity depth between an object and a pupil moving by an optokinetic reflex.

In order to implement a virtual reality or augmented reality technique, a smart glass adopts a technique for detecting a user's pupil and measuring the pupil position. Typically, a device configured to track the pupil on the basis of movement of the eyes by a vestibulo-ocular reflex requires a user to move his or her head. Accordingly, in order to effectively provide a gaze tracking service to the user who wears the smart glass, a technique is required capable of detecting movement of the eyes regardless of the movement of the head.

In addition, in order to conveniently use the smart glass, a technique is also required capable of detecting movement of pupils without a binocular camera or a beamforming device.

SUMMARY

The present disclosure provides a pupil tracking device and a pupil tracking method for measuring a pupil center position and a proximity depth between an object and a pupil moving by an optokinetic reflex.

An embodiment of the inventive concept provides a pupil tracking device, which measures a pupil center position of an eye moving according to an optokinetic reflex, and a proximity depth between a pupil and an object, the pupil tracking device including: a light source configured to output infrared light; a display configured to output object light; a waveguide configured to guide the infrared light and the object light towards a direction to the pupil; a film configured to separate the infrared reflected by a cornea of the eye into a plurality of light beams; and an optical pickup configured to detect the plurality of light beams and measure the pupil center position and the proximity depth.

In an embodiments of the inventive concept, a pupil tracking method, which measures a pupil center position of an eye moving according to an optokinetic reflex, and a proximity depth between a pupil and an object, the pupil tracking method including: outputting infrared light from an optical source, and an object light from a display; separating the infrared light reflected by a cornea of the eye into a plurality of light beams; detecting, by a plurality of optical detectors, the plurality of light beams; and measuring the pupil center position and the proximity depth on a basis of the plurality of light beams.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 8 illustrates an exemplary table showing use of the optical detectors configured to detect a movement direction of a pupil in the disposition of the exemplary optical detectors of FIG. 6;

FIG. 12 is a flowchart exemplarily showing a pupil tracking method according to some exemplary embodiments of the inventive concept.

DETAILED DESCRIPTION

Hereinafter, an exemplary embodiment of the present disclosure will be described in detail with reference to the accompanying drawings such that a person skilled in the art may easily carry out the embodiments of the present disclosure.

In the descriptions below, left, right, up and down directions for explaining movements of the head, an eye, and a pupil are all based on an observer who observes the head and the eye. The left, right, up and down directions of the pupil are defined based on the pupil center position. When the eye looks straight ahead, the pupil positions at the pupil center position. A proximity direction of an object with respect to the pupil is defined as a direction in which the object comes close toward the pupil. For example, the horizontal direction of the pupil includes the left and right directions, and the vertical direction of the pupil includes the up and down directions.

Figure 1:
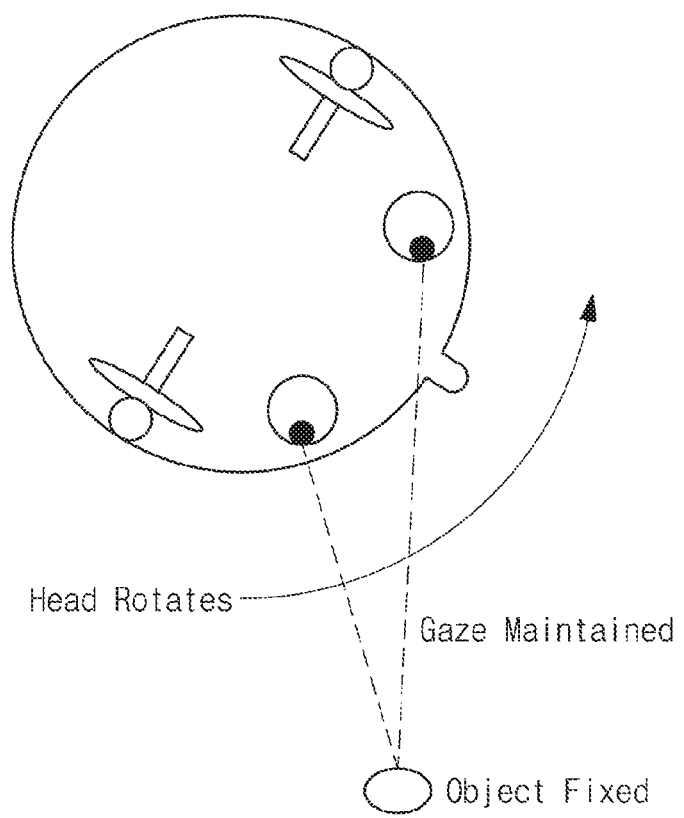
FIG. 1 illustrates a movement of an eye according to a vestibulo-ocular reflex.
Figure 2:
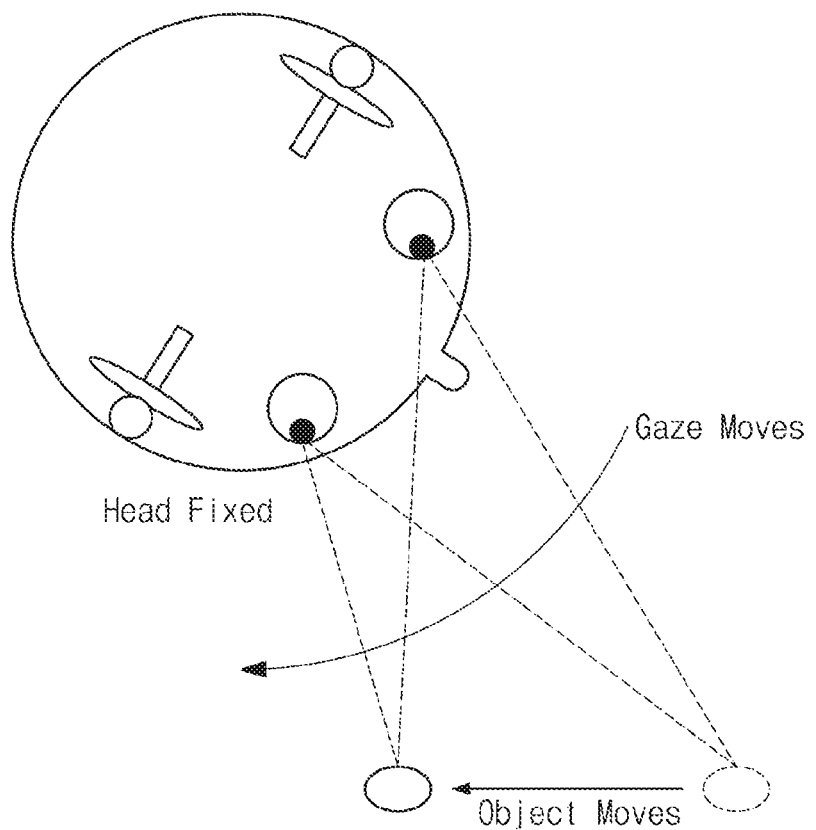
FIG. 2 illustrates a movement of an eye according to an optokinetic reflex.

FIG. 1 illustrates a movement of an eye according to a vestibulo-ocular reflex. FIG. 2 illustrates a movement of an eye according to an optokinetic reflex. FIGS. 1 and 2 will be described together. A gaze tracking movement through which an object, a target, or an image is gazed may be classified into the vestibulo-ocular reflex and the optokinetic reflex. The vestibulo-ocular reflex is a reflex which automatically maintains a movement of an eyeball, when the head moves. In relation to FIG. 1, while the head moves, the vestibulo-ocular reflex may move the eyeball in the opposite direction to the movement direction of the head. When an object is fixed, even when the head rotates, the gaze may be fixed to the object by the vestibulo-ocular reflex. For example, when the head moves rightwardly, the eye may move leftwardly through the vestibulo-ocular reflex. An image may be focused on the retina as long as possible by the vestibulo-ocular reflex, and the eye may look clearly the object in the field of vision. The vestibulo-ocular reflex may stabilize the focus on the field of vision and the object on the retina, and preserve the object in the center of the field of vision.

The optokinetic reflex is a combination of a saccade and a smooth pursuit movement. In relation to FIG. 2, while the head is fixed and the object moves, the optokinetic reflex may move the eyeball in the moving direction of the object. With the head fixed, the gaze may be maintained on the moving object. For example, when looking at a moving object out of the window, the eyeball may focus on the moving object during a short moment through smooth pursuit, until the object moves out of the field of vision. At the time when the object disappears out of the field of vision, the eyeball may move back to the point where it first saw the object.

Typically, a device configured to track the pupil on the basis of movement of the eye according to the vestibulo-ocular reflex requires the user to move his or her head. However, the device configured to track the pupil on the basis of the movement of the eye may detect the movement of the eye regardless of the movement of the head. Accordingly, in order to effectively provide a gaze tracking service to a user who wears smart glasses, a pupil tracking device and a pupil tracking method are required which measure a pupil center position and a proximity depth between an object and a pupil moving by an optokinetic reflex.

Figure 3:
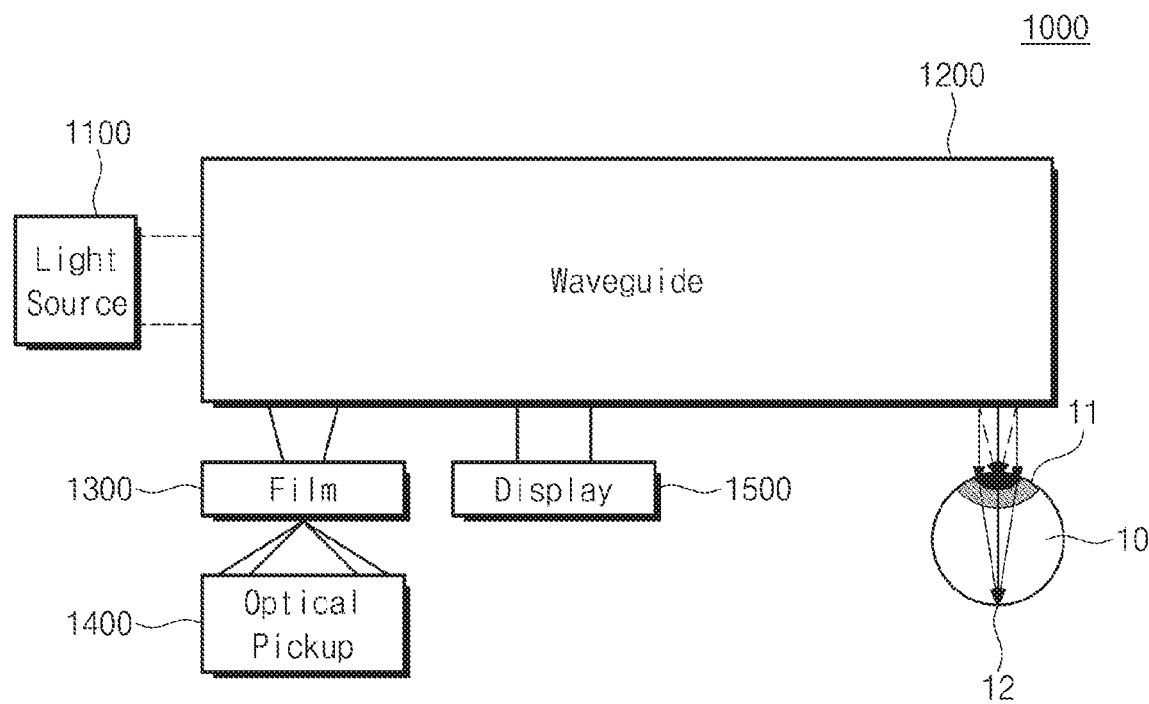
FIG. 3 illustrates a block diagram of a pupil tracking device according to some exemplary embodiments of the inventive concept.

FIG. 3 illustrates a block diagram of a pupil tracking device according to some exemplary embodiments of the inventive concept. The pupil tracking device 1000 may include a light source 1100, a waveguide 1200, a film 1300, an optical pickup 1400, and a display 1500.

The light source 1100 may be a laser diode configured to output infrared light. The infrared light output from the light source 1100 may propagate towards the pupil of an eye 10 via the waveguide 1200. The propagating infrared light may reach the cornea 11 of the eye 10. The light source 1100 may project the infrared light onto the cornea 11, and the infrared light reaching the cornea 11 may be reflected by the cornea 11. The reflected infrared light may propagate in the reverse direction to the pupil via the waveguide 1200. When propagating in the reverse direction, the infrared light may reach the optical pickup 1400 via the waveguide 1200.

In an embodiment, the reflected infrared light may be transmitted through the film 1300 via the waveguide 1200 and be separated into a plurality of light beams by the film 1300. The plurality of light beams separated by the film 1300 may reach the optical pickup 1400. In another embodiment, the infrared light may be separated into first to fourth light beams by the film 1300, and the first to fourth light beams may reach the optical pickup 1400. The film 1300 may include a holographic optical element (HOE) pattern.

The waveguide 1200 may guide or propagate the infrared light output from the light source 1100 and object light output from the display 1500 according to the total internal reflection principle. The guided infrared light and object light may propagate toward the pupil. In addition, the guided infrared light may propagate in the reverse direction towards the pupil.

The display 1500 may output the object light. The display 1500 may emit with a point light source. The type may detect or sense an object from the object light. The object light output from the display 1500 may propagate towards the pupil via the waveguide 1200. The propagating object light may reach the fovea centralis of retina 12. An image of the object light and an image of the object may be focused on the retina, and the eye may detect the object light and the object. The display 1500 may be liquid crystal on silicon (LCoS) or an organic light emitting diode (OLED).

Figure 4:
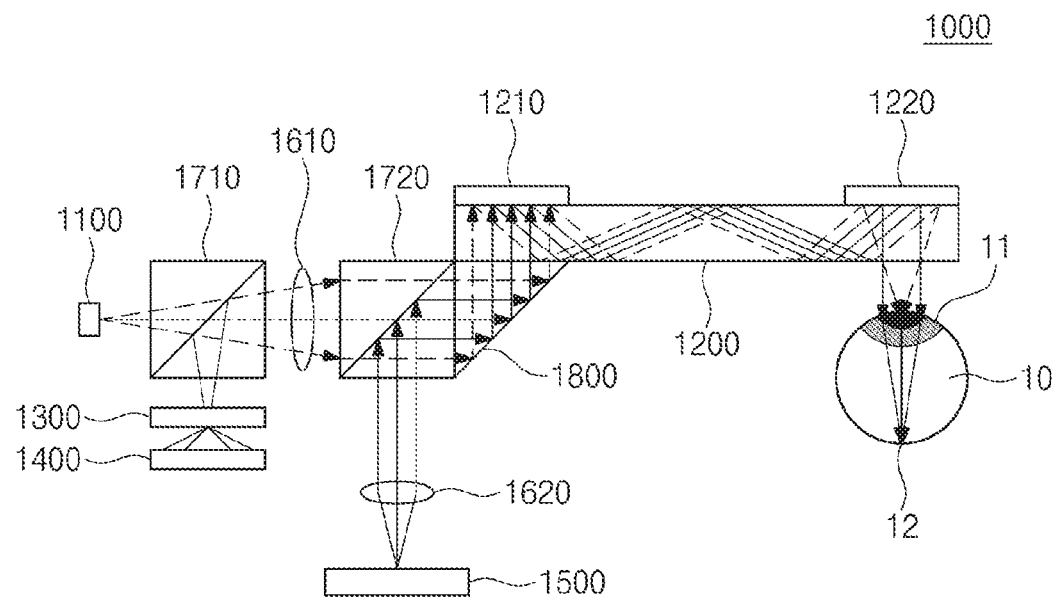
FIG. 4 illustrates the pupil tracking device of FIG. 3 more specifically.

FIG. 4 illustrates the pupil tracking device of FIG. 3 more specifically. FIG. 4 will be explained with reference to FIG. 3. The pupil tracking device 1000 may further include first and second lenses 1610 and 1620, a reflective plate 1800, first and second patterns 1210 and 1220, first and second beam separators 1710 and 1720.

The first and second lenses 1610 and 1620 may collimate transmission light to make the transmission light parallel. The infrared light output from the light source 1100 and the infrared light reflected by the cornea 11 may be transmitted through the first lens 1610. The first lens 1610 may make the transmitted infrared light parallel. The object light output from the display 1500 may be transmitted through the second lens 1620. The second lens 1620 may make the transmitted object light parallel. The infrared light and the object light may be collimated by the first and second lenses 1610 and 1620.

The reflective plate 1800 may reflect the infrared light and the object light. The infrared light and the object light may be incident to the waveguide 1200 via the reflective plate 1800. The infrared light reflected by the cornea 11 may be reflected by the reflective plate 1800 via the waveguide 1200. The reflective plate 1800 may be metal.

The waveguide 1200 may include first and second patterns 1210 and 1220. For example, the waveguide 1200 may include the first and second patterns 1210 and 1220 in a type of being attached to the waveguide 1200. The first and second patterns 1210 and 1220 may guide the infrared light and the object light in a direction towards the pupil and in the reverse direction thereto according to the total internal reflection principle. In addition, the second pattern 1220 may collect the infrared light to the pupil center position. The first pattern 1210 may include an HOE pattern. The second pattern 1220 may include the HOE pattern or a diffractive optical element (DOE) pattern. The HOE pattern may guide the infrared light and the object light, and the DOE pattern may collect the infrared light to the pupil center position.

The first and second beam separators 1710 and 1720 may separate the transmission light into a polarized light beam and a non-polarized light beam according to the polarization characteristics. The first beam separator 1710 may separate the infrared light into a polarized infrared light beam and a non-polarized infrared light beam. The second beam separator 1720 may separate the object light output from the display 1500 into a polarized object light beam and a non-polarized light beam according to the polarization characteristics. When the second beam separator 1720 has a lens type reflective surface, the second lens 1620 may not be necessary.

In an embodiment, the infrared light output from the light source 1100 may be transmitted through the first lens 1610. The infrared light made parallel by the first lens 1610 may be incident to the waveguide 1200 via the reflective plate

1800. The incident infrared light may be guided towards the pupil by the first and second patterns 1210 and 1220 on the basis of the total internal reflection principle. The second pattern 1220 may collect the incident infrared light to the pupil center position. The infrared light collected at the pupil center position may be reflected by the cornea 11.

In another embodiment, the infrared light reflected by the cornea 11 may propagate in the reverse direction from the pupil inside the waveguide 1200. The first and second patterns 1210 and 1220 may guide the infrared light reflected by the cornea 11 in the reverse direction from the pupil on the basis of the total internal reflection principle. The infrared light reflected by the cornea 11 may be transmitted through the first lens 1610 via the waveguide 1800. The transmitted infrared light may be separated by the first beam separator 1710 according to the polarization characteristics. The separated infrared light beams may reach the optical pickup 1400 via the film 1300.

In another embodiment, the object light output from the display 1500 may be transmitted through the second lens 1620. The object light made parallel by the second lens 1620 may be incident to the waveguide 1200 via the reflective plate 1800. The incident object light may propagate towards the pupil by the first and second patterns 1210 and 1220 on the basis of the total internal reflection principle. The propagating object light may reach the fovea centralis of retina 12. An image of the object light and an image of the object may be focused on the retina, and the eye may detect the object light and the object.

Figure 5:
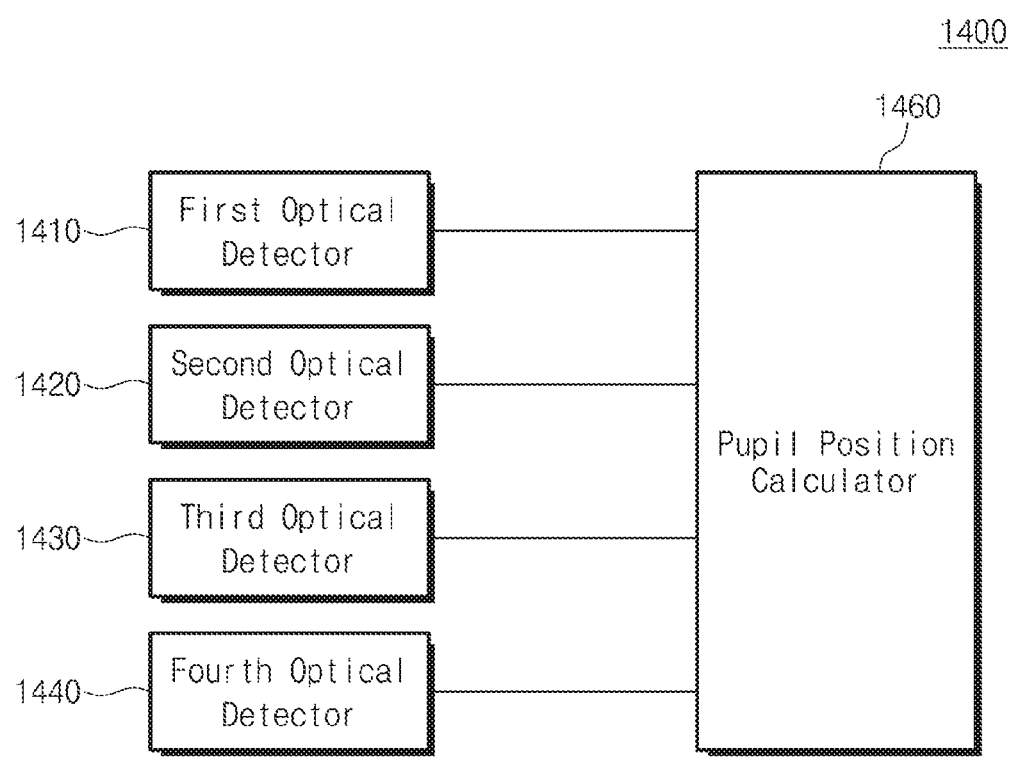
FIG. 5 illustrates a block diagram of an exemplary optical pickup in a pupil tracking device according to some exemplary embodiments of the inventive concept.

FIG. 5 illustrates a block diagram of an exemplary optical pickup in the pupil tracking device according to some exemplary embodiments of the inventive concept. FIG. 5 will be explained with reference to FIG. 3.

The optical pickup 1400 may include first to fourth optical detectors 1410 to 1440, and a pupil position calculator 1460. The first to fourth optical detectors 1410 to 1440 may detect the infrared light output from the light source 1100. The infrared light may be separated into first to fourth light beams, and the first to fourth light beams may reach the optical pickup 1400. The first to fourth optical detectors 1410 to 1440 may detect first to fourth light beams respectively, and output first to fourth voltages according to the first to fourth light beams.

On the basis of the first to fourth light beams, the first to fourth optical detectors 1410 to 1440 may detect movements of the pupil. Here, the movements of the pupil may include horizontal and vertical direction movements of the pupil. For example, the first and second optical detectors 1410 and 1420 may detect the horizontal direction movement of the pupil on the basis of the first and second light beams, and the third and fourth optical detectors 1430 and 1440 may detect the vertical direction movement of the pupil on the basis of the third and fourth light beams.

The first to fourth optical detectors 1410 to 1440 may detect a movement in a proximal direction of the object with respect to the pupil. For example, the third and fourth optical detectors 1430 and 1440 may detect the movement in the proximal direction of the object with respect to the pupil. Here, the object may be detected from the object light with the eye.

The pupil position calculator 1460 may be connected to the first to fourth optical detectors 1410 to 1440. The first to fourth voltages output from the first to fourth optical detectors 1410 to 1440 may be received by the pupil position calculator 1460. The pupil position calculator 1460 may calculate the movement distances of the pupil on the basis of the first to fourth voltages. Here, the movement distances of the pupil may include the horizontal direction movement distance and the vertical direction movement distance of the pupil. For example, the pupil position calculator 1460 may calculate the horizontal direction movement distance of the pupil on the basis of the first and second voltages, and calculate the vertical direction movement distance of the pupil on the basis of the third and fourth voltages.

The pupil position calculator 1460 may detect the proximal direction movement of the object with respect to the pupil on the basis of the first to fourth voltages. For example, the pupil position calculator 1460 may calculate the proximal direction movement of the object with respect to the pupil on the basis of the third and fourth voltages.

Figure 6:
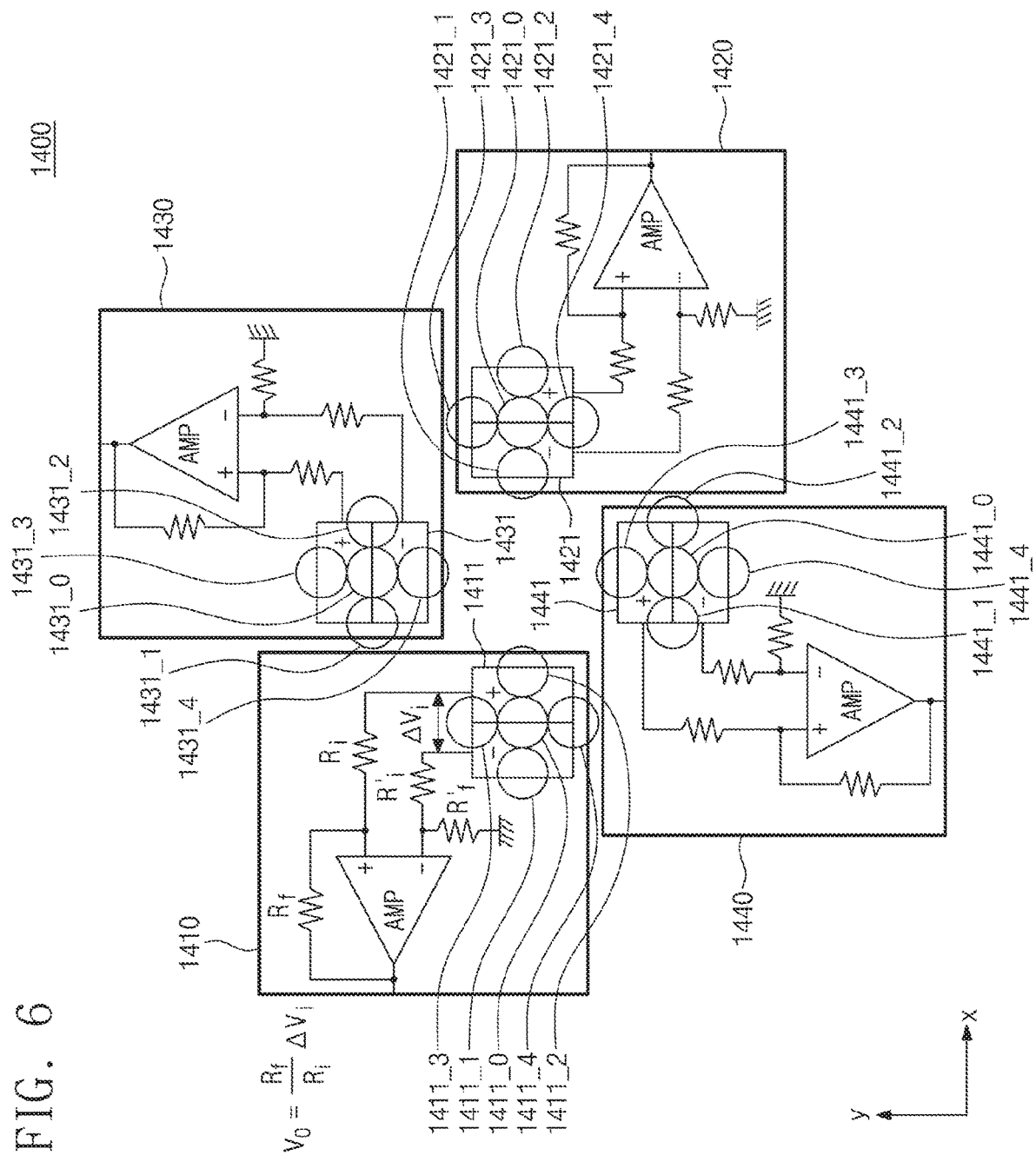
FIG. 6 illustrates an exemplary disposition of optical detectors in the pupil tracking device according to some exemplary embodiments of the inventive concept.

FIG. 6 illustrates an exemplary disposition of the optical detectors in the pupil tracking device according to some exemplary embodiments of the inventive concept. In FIG. 6, the pupil position calculator 1460 of the optical pickup 140 is omitted, and the first to fourth optical detectors 1410 to 1440 of the optical pickup 1400 are shown. FIG. 6 will be described with reference to FIGS. 3 and 5. It is assumed that the infrared light reaching the first to fourth optical detectors 1410 to 1440 has been reflected by the cornea of the right eye.

In FIG. 6, an x-axis and a y-axis may be references for positions of the first to fourth photodiodes 1411 to 1441 and positions on which the first to fourth light beams are illuminated. For example, the x-axis may correspond to a direction to which the pupil moves horizontally. The y-axis is perpendicular to the x-axis and may correspond to a direction to which the pupil moves vertically.

The first to fourth optical detectors 1410 to 1440 may include the first to fourth photodiodes 1411 to 1441. The first to fourth photodiodes 1411 to 1441 may be bi-cell photodiodes.

The first to fourth photodiodes 1411 to 1441 may respectively detect the first to fourth light beams. On the basis of the first to fourth light beams, the first to fourth photodiodes 1411 to 1441 may detect the horizontal direction movement and the vertical direction movement of the pupil, and the proximal direction movement of the object with respect to the pupil.

The first to fourth photodiodes 1411 to 1441 may be respectively disposed at positions on which the first to fourth light beams are illuminated. The first and second photodiodes 1411 and 1421 may be disposed such that positive terminals and negative terminals thereof are arrayed along the x-axis. For example, the positive terminals of the first and second photodiodes 1411 and 1421 may face an identical direction on the x-axis. The positive terminals of the third and fourth photodiodes 1431 and 1441 may be disposed such that the positive terminals and the negative terminals are arrayed along the y-axis. For example, the positive terminals of the third and fourth photodiodes 1431 and 1441 may face an identical direction on the x-axis. The first to fourth photo diodes 1411 to 1441 may respectively detect the first to fourth light beams, and respectively output first to fourth voltage differences according to the first to fourth light beams. The positions of the first to fourth photodiodes 1411 to 1441 disposed along the x-axis and y-axis illustrated in FIG. 6 are only exemplary. In addition, the directions of the positive terminals and the negative terminals of the first to fourth photodiodes 1411 to 1441 illustrated in FIG. 6 are also only exemplary.

The pupil position calculator 1460 may calculate the movement distances in each direction of the pupil on the basis of the amplitudes of the first to fourth voltage differences output from the first to fourth photodiodes 1411 to

1441. The amplitudes and signs of the first to fourth voltage differences may be determined according to the positions on the first to fourth photodiodes 1411 to 1441 on which the first to fourth light beams are illuminated.

When the pupil faces straight ahead, the first to fourth light beams may be illuminated on the center points 1411_0 to 1441_0 of the first to fourth photodiodes 1411 to 1441.

When the pupil moves leftwardly with respect to the pupil center position, the first to fourth light beams may be illuminated on left points 1411-1 to 1441_1 of the first to fourth photodiodes 1411 to 1441. As the pupil further moves leftwardly with respect to the pupil center position, the amplitudes of the first and second voltage differences output from the first and second photodiodes 1411 and 1421 may become larger.

When the pupil moves rightwardly with respect to the pupil center position, the first to fourth light beams may be illuminated on right points 1411-2 to 1441_2 of the first to fourth photodiodes 1411 to 1441. As the pupil further moves rightwardly with respect to the pupil center position, the amplitudes of the first and second voltage differences output from the first and second photodiodes 1411 and 1421 may become larger.

When the pupil moves upwardly with respect to the pupil center position, the first to fourth light beams may be illuminated on upper points 1411-3 to 1441_3 of the first to fourth photodiodes 1411 to 1441. As the pupil further moves upwardly with respect to the pupil center position, the amplitudes of the third and fourth voltage differences output from the third and fourth photodiodes 1431 and 1441 may become larger.

When the pupil moves downwardly with respect to the pupil center position, the first to fourth light beams may be illuminated on lower points 1411-4 to 1441_4 of the first to fourth photodiodes 1411 to 1441. As the pupil further moves downwardly with respect to the pupil center position, the amplitudes of the first and second voltage differences output from the third and fourth photodiodes 1431 and 1441 may become larger.

When the object moves in the proximal direction with respect to the pupil, since it is assumed that the infrared light has been reflected by the cornea of the right eye, the third and fourth light beams may be illuminated on left points 1431_1 to 1441_1 of the third and fourth photodiodes 1431 and 1441. As the object further moves in the proximal direction with respect to the pupil, the amplitudes of the third and fourth voltage differences output from the third and fourth photodiodes 1431 and 1441 may become larger.

The positions on which the first and fourth light beams shown in FIG. 6 are illuminated according to each directional movement of the pupil are only exemplary.

Each of the first to fourth optical detectors 1410 to 1440 may include an amplifier AMP. Each of the amplifiers may be a differential amplifier. A plurality of resistors may be connected between each amplifier and each of the first to fourth diodes 1411 to 1441. For example, the resistors $R_f$, $R_i$, $R'_f$ and $R'_i$, may be connected between the amplifier and the first photodiode 1411.

The amplifiers may respectively amplify the first to fourth voltage differences output from the first to fourth photodiodes 1411 to 1441 on the basis of the resistors $R_f$, $R_i$, $R'_f$ and $R'_i$ to generate the first to fourth voltages. Output terminals of the amplifiers may be connected to the pupil position calculator 1460 and the pupil position calculator 1460 may receive the first to fourth voltages.

In relation to FIG. 6, for example, the first voltage difference $\Delta V_i$ output from the first photodiode 1411 may be amplified by the amplifier on the basis of ratios of the resistors $R_f$, $R_i$, $R'_f$, and $R'_i$ to generate the first voltage ($V_0$, where $$V_0 = \frac{R_f}{R_I} \Delta V_i,$$

in FIG. 6). The pupil position calculator 1460 may receive the first voltage. Similarly, the second to fourth voltages may be generated, and the pupil position calculator 1460 may receive the second to fourth voltages.

The amplitudes and signs of the first to fourth voltages may be determined according to the amplitudes and signs of the first to fourth voltage differences. For example, the amplitudes of the first to fourth voltages may be proportional to those of the first to fourth voltage differences, and the signs of the first to fourth voltages may be the same as those of the first to fourth voltage differences. The signs of the first to fourth voltages will be described more specifically in relation to FIG. 8.

Figure 7:
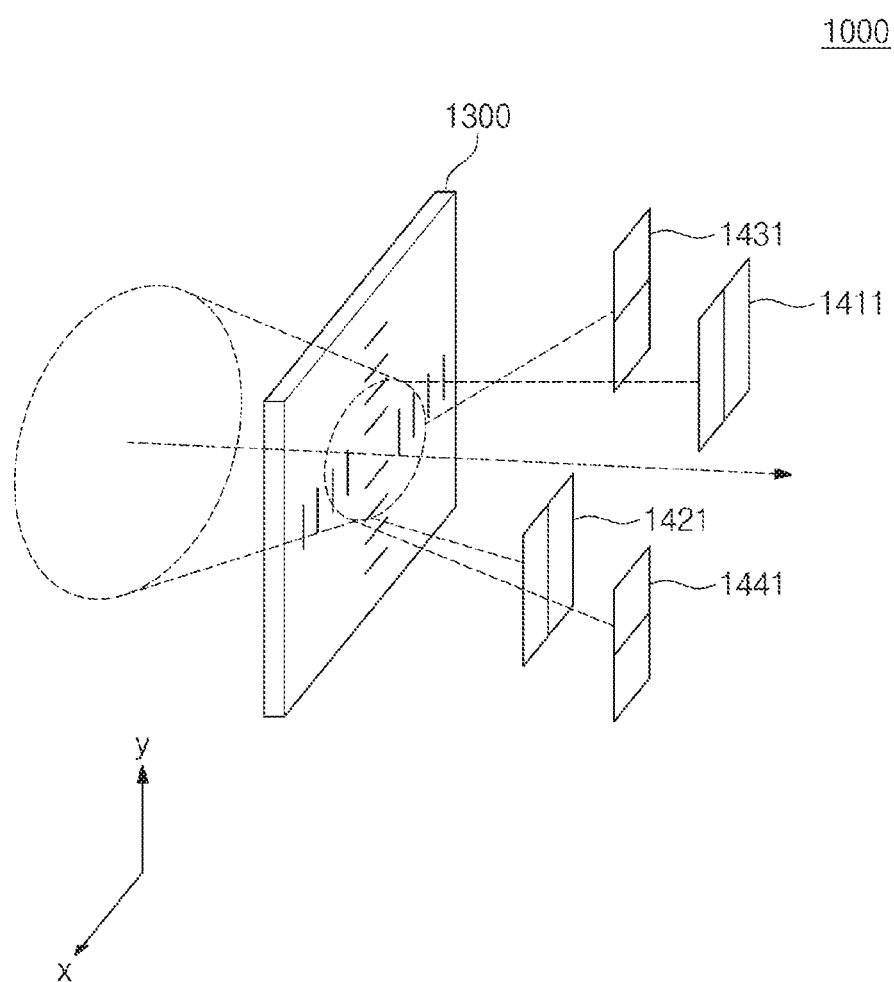
FIG. 7 illustrates an exemplary disposition of a film and optical detectors in the pupil tracking device according to some exemplary embodiments of the inventive concept.

FIG. 7 illustrates an exemplary disposition of the film and the optical detectors in the pupil tracking device according to some exemplary embodiments of the inventive concept. FIG. 7 will be described together with FIGS. 3 and 6. An x-axis and a y-axis in FIG. 7 correspond to the x-axis and y-axis in FIG. 6.

In relation to FIG. 7, the infrared light transmitted through the film 1300 may be separated into the first to fourth light beams. The separated infrared light beams may be illuminated on the positions at which the first to fourth photodiodes 1411 to 1441 are disposed. The infrared light transmitted through the film 1300 may not be separated, and when not separated, the infrared light may be transmitted through the film 1300 as it is.

FIG. 8 illustrates an exemplary table showing use of the optical detectors configured to detect the movement direction of the pupil in the exemplary disposition of the optical detectors of FIG. 6. FIG. 8 will be explained with reference to FIG. 6.

When the pupil moves rightwardly, the first and second voltages output from the first and second optical detectors 1410 and 1420 may all have positive values. In other words, when the first and second voltages output from the first and second optical detectors 1410 and 1420 all have positive values, the first and second optical detectors 1410 and 1420 may detect or sense the right direction movement of the pupil.

When the pupil moves leftwardly, the first and second voltages output from the first and second optical detectors 1410 and 1420 may all have negative values. In other words, when the first and second voltages output from the first and second optical detectors 1410 and 1420 all have negative values, the first and second optical detectors 1410 and 1420 may detect the left direction movement of the pupil.

When the pupil moves upwardly, the third and fourth voltages output from the third and fourth optical detectors 1430 and 1440 may all have positive values. In other words, when the third and fourth voltages output from the third and fourth optical detectors 1430 and 1440 all have positive values, the third and fourth optical detectors 1430 and 1440 may detect the upward direction movement of the pupil.

When the pupil moves downwardly, the third and fourth voltages output from the third and fourth optical detectors 1430 and 1440 may all have negative values. In other words, when the third and fourth voltages output from the third and fourth optical detectors 1430 and 1440 all have negative values, the third and fourth optical detectors 1430 and 1440 may detect the downward direction movement of the pupil.

When the object moves close to the pupil, the pupils of the both eyes may converge. When the pupils converge, the third and fourth voltages output from the third and fourth optical detectors 1430 and 1440 may all have negative values. In other words, when the third and fourth voltages output from the third and fourth optical detectors 1430 and 1440 all have negative values, the third and fourth optical detectors 1430 and 1440 may detect not only the downward direction movement of the pupil, but also the proximal direction movement of the object with respect to the pupil.

The signs of the first to fourth voltages according to the movement of the pupil are just exemplary. The signs of the first to fourth voltages according to the movement of the pupil may be determined according to the positions of the first to fourth optical detectors 1410 to 1440.

Figure 9:
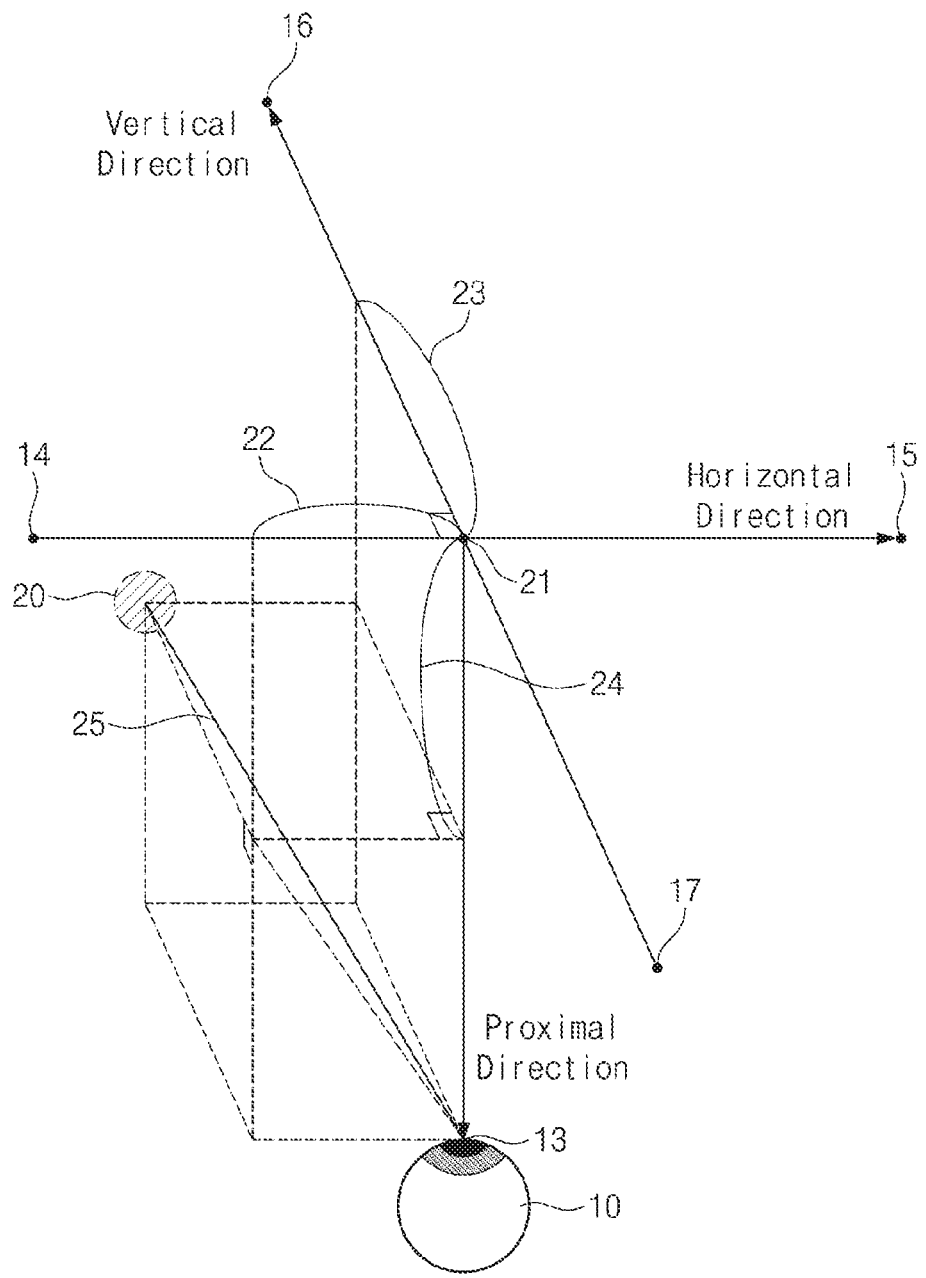
FIG. 9 illustrates a pupil tracking method according to some exemplary embodiments of the inventive concept.

FIG. 9 illustrates a pupil tracking method according to some exemplary embodiments of the inventive concept. FIG. 9 will be described with reference to FIGS. 5 and 6.

The object 20 sensed by the eye from the object light may be separated from the pupil center position 13 as much as the proximity depth 25. The pupil position calculator 1460 may calculate the proximity depth 25. In order to calculate the proximity depth 25, the pupil position calculator 1460 may set and store the leftmost, rightmost, uppermost, lowermost, and maximum proximity reference distances of the pupil. In addition, the pupil position calculator 1460 may set and store the leftmost, rightmost, uppermost, lowermost, and maximum proximity reference voltages. The leftmost, rightmost, uppermost, lowermost, and maximum proximity reference voltages may respectively correspond to the leftmost, rightmost, uppermost, lowermost, and maximum proximity reference distances.

The leftmost reference point 14, the rightmost reference point 15, the uppermost reference point 16, and the lowermost reference point 17 may be respective points at which the pupil may maximally move leftwardly, rightwardly, upwardly, and downwardly.

The leftmost reference distance of the pupil may be the distance from an object reference point 21 to the leftmost reference point 14 of the pupil. The rightmost reference distance of the pupil may be the distance from the object reference point 21 to the rightmost reference point 15 of the pupil. The uppermost reference distance of the pupil may be the distance from the object reference point 21 to the uppermost reference point 16 of the pupil. The lowermost reference distance of the pupil may be the distance from the object reference point 21 to the lowermost reference point 17 of the pupil. The maximum proximal reference distance of the pupil may be the distance from the object reference point 21 to the pupil center position 13 which is the maximum proximal reference point of the object with respect to the pupil. The pupil position calculator 1460 may initialize the reference distances and the reference voltages, and be reset by each user.

The pupil position calculator 1460 may compare the leftmost or rightmost reference voltage with the first and second voltages to calculate the horizontal direction movement distance 22 of the pupil according to the leftmost or rightmost reference distance, compare the uppermost or lowermost reference voltage with the third and fourth voltages to calculate the vertical direction movement distance 23 according to the uppermost or lowermost reference distance, and compare the maximum proximal reference voltage with the absolute values of the third and fourth voltages to calculate the proximal direction movement distance 24 of the object with respect to the pupil according to the maximum proximal reference distance.

The horizontal direction movement distance 22, the vertical direction movement distance 23 of the pupil, and the proximal direction movement distance 24 of the object with respect to the pupil may be calculated in proportion to the reference distances and the reference voltages.

The pupil position calculator 1460 may calculate the proximity depth 25 from the horizontal direction movement distance 22, the vertical direction movement distance 23 of the pupil, and the proximal direction movement distance 24 of the object with respect to the pupil.

In an embodiment, the pupil position calculator 1460 may store Equations for calculating the proximity depth 25 from the horizontal direction movement distance 22, the vertical direction movement distance 23 of the pupil, and the proximal direction movement distance 24 of the object with respect to the pupil.

When the pupil moves leftwardly and upwardly, and the object moves in the proximal direction with respect to the pupil, the proximity depth 25 may be calculated according to the following Equation (1).

$$\text{proxmity depth} = \sqrt{\begin{array}{l}(\text{maximum proximal reference distance} - \\ \text{proximal direction movement distance})^2 + \\ (\text{leftward movement distance})^2 + \\ (\text{upward movement direction})^2\end{array}} \quad (1)$$

When the pupil moves leftwardly and downwardly, and the object moves in the proximal direction with respect to the pupil, the proximity depth 25 may be calculated according to the following Equation (2).

$$\text{proxmity depth} = \sqrt{\begin{array}{l}(\text{maximum proximal reference distance} - \\ \text{proximal direction movement distance})^2 + \\ (\text{leftward movement distance})^2 + \\ (\text{downward movement direction})^2\end{array}} \quad (2)$$

When the pupil moves rightwardly and upwardly, and the object moves in the proximal direction to the pupil, the proximity depth 25 may be calculated according to the following Equation (3).

$$\text{proxmity depth} = \sqrt{\begin{array}{l}(\text{maximum proximal reference distance} - \\ \text{proximal direction movement distance})^2 + \\ (\text{rightward movement distance})^2 + \\ (\text{upward movement direction})^2\end{array}} \quad (3)$$

When the pupil moves rightwardly and downwardly, and the object moves in the proximal direction to the pupil, the proximity depth 25 may be calculated according to the following Equation (4).

$$\text{proxmity depth} = \sqrt{\begin{array}{l}(\text{maximum proximal reference distance} - \\ \text{proximal direction movement distance})^2 + \\ (\text{rightward movement distance})^2 + \\ (\text{downward movement direction})^2\end{array}} \quad (4)$$

The pupil position calculator 1460 may all store Equations 1 to 4 and substitute the horizontal direction movement distance 22, the vertical direction movement distance 23, and the proximal direction movement distance 24 to Equations 1, 2, 3, or 4 to calculate the proximity depth 25.

In relation to FIG. 9, for example, the pupil may move leftwardly and upwardly, and the object may move in the proximal direction to the pupil. Here, it is assumed that the reference distances are all set to 10 cm, and the reference voltages are all set to 5 V.

When the exemplary horizontal direction movement distance 22, vertical direction movement distance 23, and proximal direction movement distance 24 are all 5 cm, the exemplary proximal depth 25 is $\sqrt{(10\text{cm}-5\text{cm})^2+(5\text{cm})^2+(5\text{cm})^2}=5\sqrt{3}$ cm according to Equation (1).

Figure 10:
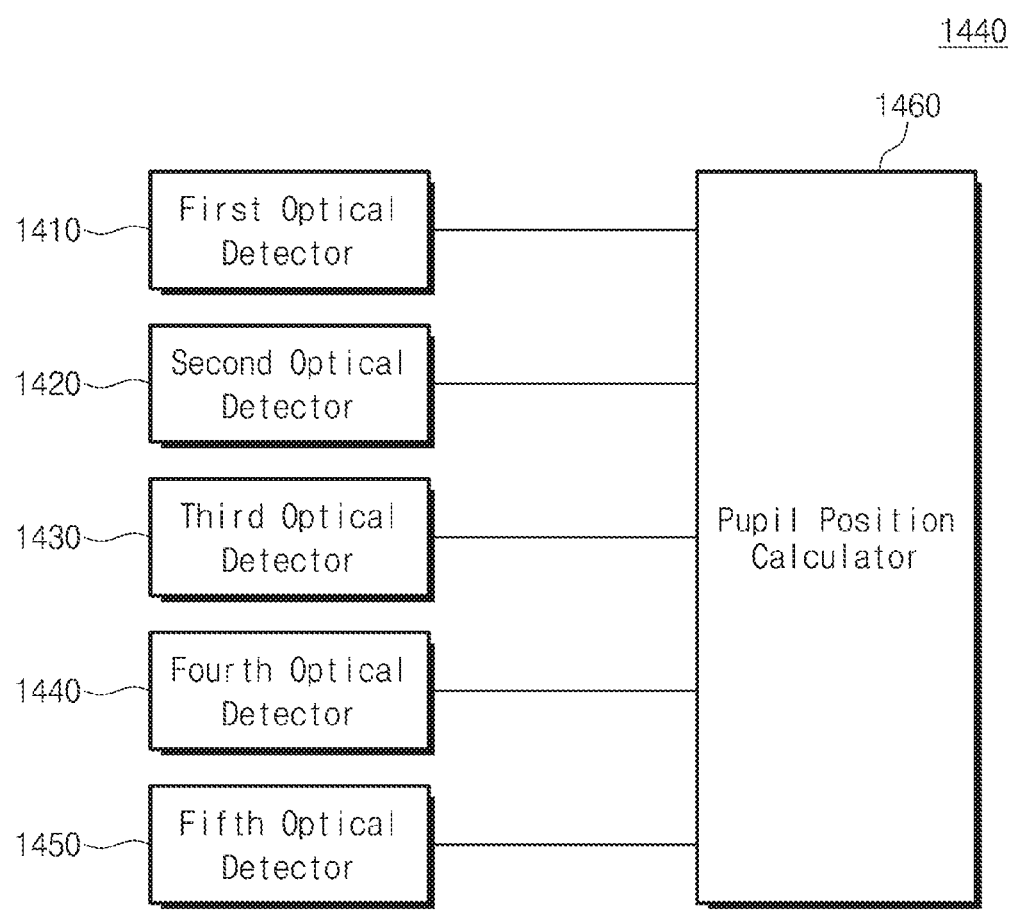
FIG. 10 illustrates another block diagram of an exemplary optical pickup in the pupil tracking device according to some exemplary embodiments of the inventive concept.

FIG. 10 illustrates another block diagram of an exemplary optical pickup in the pupil tracking device according to some exemplary embodiments of the inventive concept. The optical pickup may further include a fifth optical detector 1450.

The fifth optical detector 1450 may detect the infrared light which is not separated by the film 1300 of FIG. 3 and is transmitted as it is. The infrared light which is not separated by the film 1300 of FIG. 3 and is transmitted as it is may be fifth light. The fifth optical detector 1450 may detect or sense the focus of the eye on the basis of the fifth light. The fifth optical detector 1450 may output a fifth voltage on the basis of the fifth light.

The fifth optical detector 1450 may be connected to the pupil position calculator 1460. The pupil position calculator 1460 may calculate the focus of the eye on the basis of the fifth voltage according to the fifth light.

Figure 11:
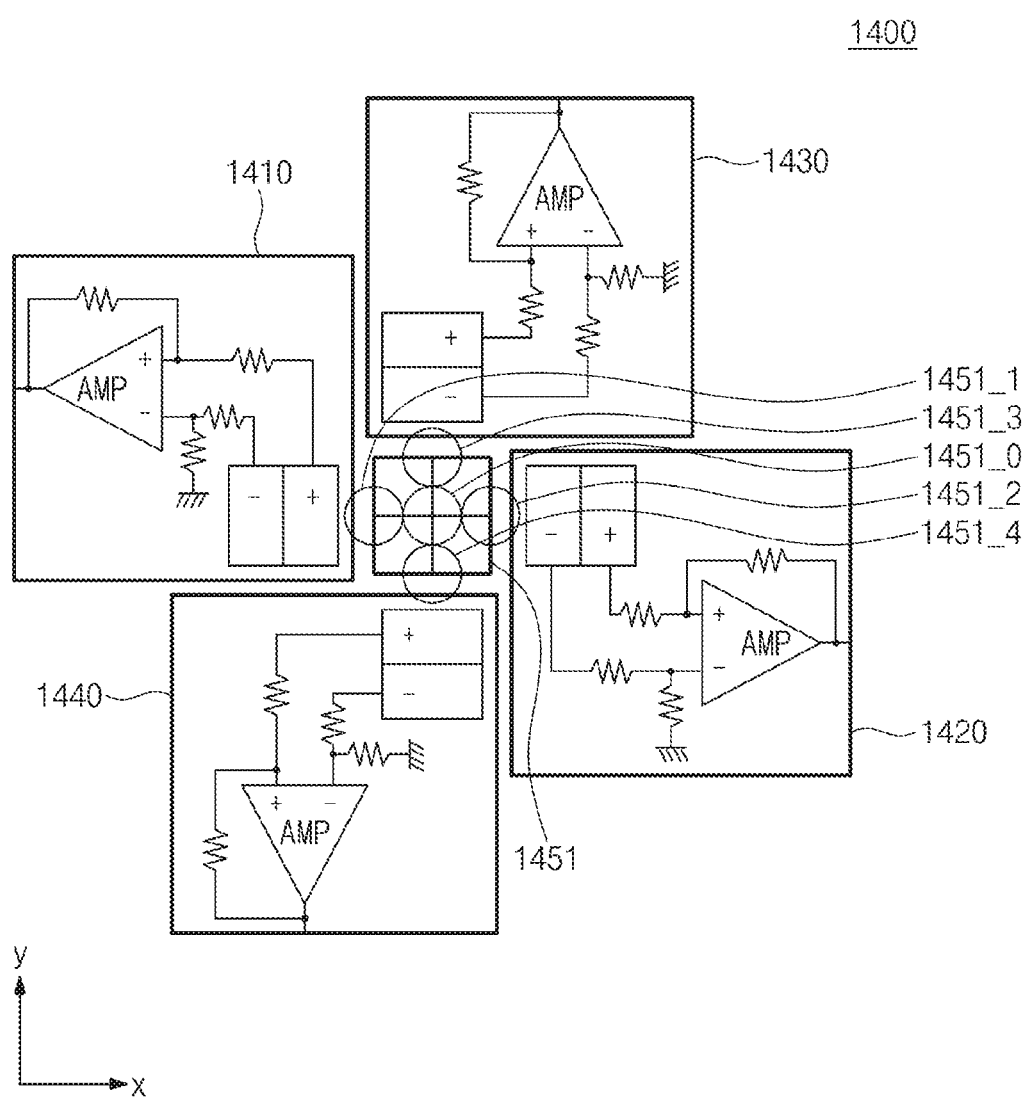
FIG. 11 illustrates another exemplary disposition of the optical detectors in the pupil tracking device according to some exemplary embodiments of the inventive concept.

FIG. 11 illustrates another exemplary disposition of the optical detectors in the pupil tracking device according to some exemplary embodiments of the inventive concept. FIG. 11 will be described with reference to FIGS. 6 and 10. In FIG. 11, the fifth optical detector 1450 is omitted. A fifth photodiode 1451 may be included in the fifth optical detector 1450. It is assumed that the infrared light reaching the fifth photodiode 1451 has been reflected by the cornea of the right eye. The fifth photodiode 1451 may be a quadrant photodiode.

The pupil position calculator 1460 may measure the focus of the eye on the basis of a fifth voltage difference output from the fifth photodiode 1451. The amplitude and sign of the fifth voltage difference may be determined according to positions on which the fifth light beam is illuminated on the fifth photodiode 1451.

When the pupil faces straight ahead, the fifth light may be illuminated on the center point 1451_0 of the fifth photodiode 1451.

When the pupil moves leftwardly, the fifth light may be illuminated on a left point 1451_1 of the fifth photodiode 1451. As the pupil further moves leftwardly with respect to the pupil center position, the amplitude of the fifth voltage difference output from the fifth photodiode 1451 may become larger.

When the pupil moves rightwardly, the fifth light may be illuminated on a right point 1451_2 of the fifth photodiode 1451. As the pupil further moves rightwardly with respect to the pupil center position, the amplitude of the fifth voltage difference output from the fifth photodiode 1451 may become larger.

When the pupil moves upwardly, the fifth light may be illuminated on an upper point 1451_3 of the fifth photodiode 1451. As the pupil further moves upwardly with respect to the pupil center position, the amplitude of the fifth voltage difference output from the fifth photodiode 1451 may become larger.

When the pupil moves downwardly, the fifth light may be illuminated on a lower point 1451_4 of the fifth photodiode 1451. As the pupil further moves downwardly with respect to the pupil center position, the amplitude of the fifth voltage difference output from the fifth photodiode 1451 may become larger.

When the object moves in the proximal direction with respect to the pupil, since it is assumed that the infrared light has been reflected by the cornea of the right eye, the fifth light may be illuminated on the left point 1451_1. As the pupil further moves in the proximal direction with respect to the pupil center position, the amplitude of the fifth voltage difference output from the fifth photodiode 1451 may become larger.

The positions on which the first and fourth light beams shown in FIG. 11 are illuminated according to each directional movement of the pupil are only exemplary.

FIG. 12 is a flowchart exemplarily showing a pupil tracking method according to some exemplary embodiments of the inventive concept. FIG. 12 will be described with reference to FIGS. 3 and 6.

In operation S110, the infrared light may be output from the light source 1100 in a direction towards the pupil. In addition, the object light may be output from the display 1500 in a direction towards the pupil. The output infrared light may reach the cornea 11. The output object light may reach the fovea centralis of the retina 12 via the waveguide 1200. An image of the object light and an image of the object may be focused on the retina, and the eye 10 may detect the object light and the object.

In operation S120, the infrared light reaching the retina 11 may be reflected by the cornea 11. The reflected infrared may reach the film 1300 via the waveguide 1200 and be separated into the first to fourth light beams by the film 1300.

In operation S130, the first to fourth light beams may respectively reach the first to fourth optical detectors 1410 to 1440. The first to fourth optical detectors 1410 to 1440 may output the first to fourth voltages from the first to fourth light beams.

In operation S141, S142, and S143, the pupil position calculators 1460 may calculate the horizontal direction movement distance and the vertical direction movement distance of the pupil, and the proximal direction movement distance of the object with respect to the pupil.

In order to calculate the proximity depth, the pupil position calculator 1460 may set and store the leftmost, rightmost, uppermost, lowermost, and maximum proximity reference distances of the pupil. In addition, the pupil position calculator 1460 may set and store the leftmost, rightmost, uppermost, lowermost, and maximum proximity reference voltages. The leftmost, rightmost, uppermost, lowermost and maximum proximity reference voltages may respectively correspond to the leftmost, rightmost, uppermost, lowermost, and maximum proximity reference distances.

The leftmost reference point, the rightmost reference point, the uppermost reference point, and the lowest reference point may be respective points at which the pupil may maximally move leftwardly, rightwardly, upwardly, and downwardly.

The leftmost reference distance of the pupil may be the distance from the object reference point to the leftmost reference point of the pupil. The rightmost reference distance of the pupil may be the distance from the object reference point to the rightmost reference point of the pupil. The uppermost reference distance of the pupil may be the distance from the object reference point to the uppermost reference point of the pupil. The lowermost reference distance of the pupil may be the distance from the object reference point to the lowermost reference point of the pupil. The maximum proximal reference distance of the pupil may be the distance from the object reference point to the pupil center position which is the maximum proximal reference point of the object with respect to the pupil. The pupil position calculator 1460 may initialize the reference distances and the reference voltages, and be reset by each user.

In operation S141, the pupil position calculator 1460 may compare the leftmost or rightmost reference voltage with the first or second voltages to calculate the horizontal direction movement distance of the pupil according to the leftmost or rightmost reference distance.

In operation S142, the pupil position calculator 1460 may compare the uppermost or lowermost reference voltage with the third or fourth voltages to calculate the vertical direction movement distance of the pupil according to the uppermost or lowermost reference distance.

In operation S143, the pupil position calculator 1460 may compare the maximum proximal reference voltage with the absolute values of the third or fourth voltages to calculate the proximal direction movement distance of the object with respect to the pupil according to the maximum proximal reference distance.

The horizontal direction movement, the vertical direction movement distance and the proximal direction movement distance may be calculated in proportion to the reference distances and the reference voltages.

In operation S150, the pupil position calculator 1460 may calculate the proximity distance between the pupil and the object from the horizontal direction movement distance and the vertical direction movement distance of the pupil, and the proximal direction movement distance of the object with respect to the pupil.

In an embodiment, the pupil position calculator 1460 may store Equations for calculating the proximity depth from the horizontal direction movement and the vertical direction movement of the pupil, and the proximal direction movement distance of the object with respect to the pupil. The pupil position calculator 1460 may calculate the proximity depth by substituting the horizontal direction movement, the vertical direction movement and the proximal direction movement distance to the stored Equations.

For example, the pupil position calculator 1460 may store Equations 1 to 4 of the embodiments described in relation to FIG. 9. The pupil position calculator 1460 may calculate the proximity depth by substituting the horizontal direction movement, the vertical direction movement and the proximal direction movement distance to the stored Equations.

The pupil tracking device and the pupil tracking method according to the embodiments of the inventive concept may detect the movement of the eye by the optokinetic reflex.

The pupil tracking device and the pupil tracking method according to the embodiments of the inventive concept may measure the pupil center position and the proximity depth between the pupil and an object without a movement of the head.

The foregoing description is about detailed examples for practicing the inventive concept. The present disclosure includes not only the above-described embodiments but also simply changed or easily modified embodiments. In addition, the present disclosure may also include technologies obtained by easily modifying and practicing the above-described embodiments.

What is claimed is:

1. A pupil tracking device, which measures a pupil center position of an eye of a user moving according to an optokinetic reflex, and a proximity depth between a pupil and an object, the pupil tracking device comprising:
   a light source configured to output infrared light;
   a display configured to output object light which forms an image of the object;
   a waveguide configured to guide the infrared light and the object light towards a direction to the pupil;
   a film configured to separate the infrared reflected by a cornea of the eye into a plurality of light beams; and
   an optical pickup configured to detect the plurality of light beams and measure the pupil center position and the proximity depth that is a distance between the object displayed by the display and the pupil,
   wherein the optical pickup includes optical detectors configured to detect a movement of the eye regardless of a movement of a head of the user, and
   wherein the optical pickup detects a proximal direction movement of the object with respect to the pupil that is a movement of the object in a direction in which the object comes close toward the pupil.

2. The pupil tracking device of claim 1, wherein the waveguide comprises a holographic optical element (HOE) pattern and a diffractive optical element (DOE) pattern.

3. The pupil tracking device of claim 1, wherein the film comprises an HOE pattern.

4. The pupil tracking device of claim 1, further comprising:
   a first beam separator configured to separate the infrared light reflected by the cornea;
   a second beam separator configured to separate the object light;
   a first lens configured to transmit the infrared light; and
   a second lens configured to transmit the object light.

5. The pupil tracking device of claim 1, wherein the plurality of light beams comprises first to fourth light beams,
   wherein the optical detectors include first to fourth optical detectors on which the first to fourth light beams are illuminated; and
   wherein the optical pickup further includes a pupil position calculator connected to the first to fourth optical detectors,
   wherein the first to fourth optical detectors respectively detect the first to fourth light beams, and respectively output first to fourth voltages according to the first to fourth light beams.

6. The pupil tracking device of claim 5, wherein
   the first and second optical detectors detect a horizontal direction movement of the pupil on a basis of the first and second light beams; and the third and fourth optical detectors detect a vertical direction movement of the pupil on a basis of the third and fourth light beams.

7. The pupil tracking device of claim 6, wherein the third and fourth optical detectors further detect the proximal direction movement of the object with respect to the pupil on a basis of the third and fourth light beams.

8. The pupil tracking device of claim 5, wherein the pupil position calculator sets leftmost, rightmost, uppermost, lowermost and maximum proximal reference distances, and
sets leftmost, rightmost, uppermost, lowermost, and maximum proximity reference voltages respectively corresponding to the leftmost, rightmost, uppermost, lowermost, and maximum proximity reference distances.

9. The pupil tracking device of claim 8, wherein the pupil position calculator
compares the leftmost or rightmost reference voltage with the first or second voltages to calculate a horizontal direction movement distance of the pupil according to the leftmost or rightmost reference distance,
compares the uppermost or lowermost reference voltage with the third or fourth voltages to calculate a vertical direction movement distance of the pupil according to the uppermost or lowermost reference distance, and
compares the maximum proximal reference voltage with absolute values of the third and fourth voltages to calculate a proximal direction movement distance of the object with respect to the pupil according to the maximum proximal reference distance.

10. The pupil tracking device of claim 9, wherein the pupil position calculator calculates the proximity depth from the horizontal direction movement distance, the vertical direction movement distance, and the proximal direction movement distance.

11. The pupil tracking device of claim 5, wherein the optical pickup further comprises a fifth optical detector configured to detect a focus of the eye.

12. The pupil tracking device of claim 1, wherein:
the optical detectors detects the proximal direction movement of the object with respect to the pupil on a basis of the infrared light reflected by the cornea of the eye, and further detects a horizontal direction movement of the pupil and a vertical direction movement of the pupil on a basis of the infrared light reflected by the cornea of the eye,
wherein a proximal direction along which the proximal direction movement of the object is made, a horizontal direction along which the horizontal direction movement of the pupil is made and a vertical direction along which the vertical direction movement of the pupil is made are perpendicular to one another, and
wherein the optical detectors detect the proximal direction movement of the object based on voltages generated by the optical detectors from the infrared light reflected by the cornea of the eye when the pupil moves in accordance with movement of the object relative to the pupil.

13. A pupil tracking method, which measures a pupil center position of an eye of a user moving according to an optokinetic reflex, and a proximity depth between a pupil and an object, the pupil tracking method comprising:
outputting infrared light from an optical source, and an object light from a display, the object light forming an image of the object;
separating the infrared light reflected by a cornea of the eye into a plurality of light beams;
detecting, by a plurality of optical detectors, the plurality of light beams; and
measuring the pupil center position and the proximity depth on a basis of the plurality of light beams, the proximity depth being a distance between the object displayed by the display and the pupil,
wherein the measuring of the pupil center position and the proximity depth comprises detecting a movement of the eye by the optical detectors regardless of a movement of a head of the user,
wherein the measuring of the proximity depth comprises detecting a proximal direction movement of the object with respect to the pupil in a direction in which the object comes close toward the pupil.

14. The pupil tracking method of claim 13, wherein the measuring of the pupil center position and the proximity depth comprises:
detecting a horizontal direction movement of the pupil;
detecting a vertical direction movement of the pupil; and
detecting the proximal direction movement of the object with respect to the pupil.

15. The pupil tracking method of claim 13, wherein
the plurality of light beams comprises first to fourth light beams,
the plurality of optical detectors comprise first to fourth optical detectors,
the measuring of the pupil center position and the proximity depth comprises outputting first to fourth voltages according to the first to fourth light beams, and
the amplitudes of the first to fourth voltages are determined according to positions on which the first to fourth light beams are illuminated on the first to fourth optical detectors.

16. The pupil tracking method of claim 15, wherein the measuring of the pupil center position and the proximity depth comprises:
setting leftmost, rightmost, uppermost, lowermost and maximum proximal reference distances of the pupil, and
setting leftmost, rightmost, uppermost, lowermost, and maximum proximity reference voltages respectively corresponding to the leftmost, rightmost, uppermost, lowermost, and maximum proximity reference distances.

17. The pupil tracking method of claim 16, wherein the measuring of the pupil center position and the proximity depth comprises:
comparing the leftmost or rightmost reference voltage with the first or second voltages to calculate a horizontal direction movement distance of the pupil according to the leftmost or rightmost reference distance;
comparing the uppermost or lowermost reference voltage with the third or fourth voltages to calculate a vertical direction movement distance of the pupil according to the uppermost or lowermost reference distance, and
comparing the maximum proximal reference voltage with absolute values of the third and fourth voltages to calculate a proximal direction movement distance of the object with respect to the pupil according to the maximum proximal reference distance.

18. The pupil tracking method of claim 17, wherein, in the measuring of the pupil position and the proximity depth, the proximity depth is calculated from the horizontal direction movement distance, the vertical direction movement distance, and the proximal direction movement distance.

19. The pupil tracking method of claim 13, further comprising:
 detecting a focus of the eye.

20. The pupil tracking method of claim 13, wherein the proximal direction movement of the object with respect to the pupil is detected on a basis of the infrared light reflected by the cornea of the eye,
 wherein the measuring of the pupil center position and the proximity depth further comprises detecting a horizontal direction movement of the pupil and a vertical direction movement of the pupil on a basis of the infrared light reflected by the cornea of the eye,
 wherein a proximal direction along which the proximal direction movement of the object is made, a horizontal direction along which the horizontal direction movement of the pupil is made and a vertical direction along which the vertical direction movement of the pupil is made are perpendicular to one another, and
 wherein the proximal direction movement of the object is detected based on voltages generated by the optical detectors from the infrared light reflected by the cornea of the eye when the pupil moves in accordance with movement of the object relative to the pupil.

* * * * *